US010300826B2

(12) United States Patent
Denbo et al.

(10) Patent No.: US 10,300,826 B2
(45) Date of Patent: May 28, 2019

(54) JUVENILE VEHICLE SEAT WITH CUPHOLDER

(71) Applicant: Dorel Juvenile Group, Inc., Foxboro, MA (US)

(72) Inventors: Sean R. Denbo, Columbus, IN (US);
Kyle M. Franke, Columbus, IN (US);
Devin J. Coakley, Bellingham, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 15/692,223

(22) Filed: Aug. 31, 2017

(65) Prior Publication Data

US 2018/0086244 A1    Mar. 29, 2018

Related U.S. Application Data

(60) Provisional application No. 62/382,356, filed on Sep. 1, 2016.

(51) Int. Cl.
*A47C 7/62* (2006.01)
*B60N 3/10* (2006.01)
*B60N 2/28* (2006.01)

(52) U.S. Cl.
CPC .............. *B60N 3/103* (2013.01); *B60N 2/28* (2013.01); *A47C 7/62* (2013.01)

(58) Field of Classification Search
CPC . B60N 3/10; B60N 3/103; B60N 3/12; B60N 3/101; B60N 3/102; B60N 3/105; B60N 3/106; B60N 3/107; B60N 3/108; B60N 2/28; B60N 2/2806; A47C 7/622; A47C 7/624; A47C 7/626; A47C 7/62; A47C 7/68; A47C 7/70; B60R 2011/0014; B60R 2011/0042; B60R 2011/0059; B60R 2011/0061; B60R 2011/0071; B60R 2011/0073

See application file for complete search history.

(56) References Cited

U.S. PATENT DOCUMENTS

| 3,637,184 | A | * | 1/1972 | O'Brien | A47C 7/70 211/1.3 |
| 4,262,962 | A | * | 4/1981 | Yust | A47C 7/70 297/145 |
| 4,957,254 | A | | 9/1990 | Hill | |
| 5,106,046 | A | * | 4/1992 | Rowles | B60N 3/103 248/214 |
| 5,232,262 | A | * | 8/1993 | Tseng | A47C 7/54 224/275 |
| 5,238,212 | A | * | 8/1993 | Dechellis | A47C 7/68 248/311.2 |

(Continued)

FOREIGN PATENT DOCUMENTS

| EP | 1810872 | A1 | | 7/2007 | |
| FR | 2753663 | A1 | * | 3/1998 | ............. B60N 3/103 |

OTHER PUBLICATIONS

International (PCT) Search Report and Written Opinion for PCT/US2017/049650 dated Nov. 13, 2017, CO-1232 PCT I, 9 pages.

*Primary Examiner* — Kyle J. Walraed-Sullivan
(74) *Attorney, Agent, or Firm* — Barnes & Thornburg LLP

(57) ABSTRACT

The present disclosure relates to a child restraint including a seat shell and an armrest coupled to the seat shell. The child restraint also includes a cupholder coupled to the armrest.

7 Claims, 4 Drawing Sheets

(56) References Cited

U.S. PATENT DOCUMENTS

| | | | | |
|---|---|---|---|---|
| 5,302,000 A * | 4/1994 | Ayotte | ............... | A47C 7/68 248/311.2 |
| 5,320,263 A | 6/1994 | Kobylack | | |
| 5,320,406 A * | 6/1994 | North | ............... | A47C 7/68 224/275 |
| 5,494,249 A * | 2/1996 | Ozark | ............... | B60N 3/102 224/926 |
| 5,533,782 A * | 7/1996 | Goldman | ............... | A47C 7/62 24/563 |
| 5,857,601 A * | 1/1999 | Greenwood | ............... | B62B 9/26 224/409 |
| 5,961,083 A * | 10/1999 | Hartmann | ............... | B60N 3/101 248/222.14 |
| 6,227,511 B1 * | 5/2001 | De Costa | ............... | A47C 7/62 248/311.2 |
| 6,361,105 B1 * | 3/2002 | Turner | ............... | A47C 7/62 297/16.2 |
| 6,450,468 B1 * | 9/2002 | Hamamoto | ............... | B60N 3/102 224/281 |
| 6,467,839 B1 * | 10/2002 | Kain | ............... | B60N 2/28 248/311.2 |
| 6,478,372 B1 * | 11/2002 | Lemmeyer | ............... | B60N 2/2821 297/188.18 |
| 6,520,576 B1 | 2/2003 | Burns | | |
| 6,592,180 B2 * | 7/2003 | Combs | ............... | B60N 2/28 248/311.2 |
| 6,612,649 B2 | 9/2003 | Kain | | |
| 6,666,506 B2 | 12/2003 | Burns | | |
| 6,929,229 B1 * | 8/2005 | Palmby | ............... | A47G 23/0225 248/311.2 |
| 7,284,737 B2 * | 10/2007 | Kane | ............... | A47G 23/0225 248/226.11 |
| RE40,010 E | 1/2008 | Kain | | |
| 7,360,830 B2 | 4/2008 | Balensiefer | | |
| 8,033,518 B2 * | 10/2011 | Schuchman | ............... | B60N 3/103 224/679 |
| 8,333,429 B2 * | 12/2012 | Nelson | ............... | A47C 7/62 297/188.14 |
| D673,816 S * | 1/2013 | Phillips | ............... | D7/620 |
| 8,388,058 B2 | 3/2013 | Krasley | | |
| 8,578,528 B1 | 11/2013 | Heare | | |
| 8,960,793 B2 * | 2/2015 | Gillett | ............... | B60N 2/2821 297/250.1 |
| 9,302,695 B2 * | 4/2016 | Hartenstine | ............... | B62B 7/10 |
| 9,592,180 B2 | 3/2017 | Weinstein | | |
| 9,642,485 B2 * | 5/2017 | Kuznicki, Jr. | ...... | A47G 23/0225 |
| 2002/0190547 A1 * | 12/2002 | Kain | ............... | B60N 2/2812 297/188.21 |
| 2003/0075957 A1 * | 4/2003 | Kain | ............... | B60N 2/2866 297/188.01 |
| 2004/0108758 A1 * | 6/2004 | Eastman | ............... | B60N 2/2806 297/250.1 |
| 2005/0225055 A1 * | 10/2005 | Dotsey | ............... | B62B 7/08 280/642 |
| 2006/0087161 A1 * | 4/2006 | Filgueiras | ............... | B60N 2/28 297/184.13 |
| 2006/0113826 A1 * | 6/2006 | Balensiefer | ......... | B60N 2/2866 297/188.01 |
| 2006/0119145 A1 * | 6/2006 | Stahel | ............... | A47C 7/68 297/188.16 |
| 2006/0261651 A1 * | 11/2006 | Nolan | ............... | B60N 2/2806 297/250.1 |
| 2006/0273637 A1 * | 12/2006 | Yumoto | ............... | B60N 2/2806 297/250.1 |
| 2007/0170759 A1 * | 7/2007 | Nolan | ............... | B60N 2/2851 297/250.1 |
| 2009/0229292 A1 * | 9/2009 | Sweeney | ............... | A45F 5/02 62/259.3 |
| 2012/0086245 A1 * | 4/2012 | Nelson | ............... | A47C 7/70 297/188.18 |
| 2012/0153690 A1 * | 6/2012 | Gaudreau, Jr. | ...... | B60N 2/2821 297/250.1 |
| 2012/0175921 A1 * | 7/2012 | Gaudreau, Jr. | ........ | B60N 3/101 297/183.1 |
| 2012/0217773 A1 * | 8/2012 | Jue | ............... | A47C 4/44 297/188.14 |
| 2012/0292956 A1 * | 11/2012 | Gaudreau, Jr. | ........ | B60N 3/103 297/188.04 |
| 2012/0299340 A1 * | 11/2012 | Krasley | ............... | A47C 7/68 297/188.14 |
| 2013/0200229 A1 * | 8/2013 | Corey | ............... | A47D 1/00 248/205.1 |
| 2013/0320720 A1 * | 12/2013 | Steinmetz | ............... | A47C 7/62 297/219.1 |
| 2014/0001797 A1 * | 1/2014 | Hutchinson | ............... | A47C 7/62 297/188.01 |
| 2014/0062152 A1 * | 3/2014 | Doolan | ............... | B60N 3/101 297/256.13 |
| 2014/0077544 A1 * | 3/2014 | Gaudreau, Jr. | ........ | B60N 3/101 297/250.1 |
| 2014/0125099 A1 * | 5/2014 | Williams | ............... | B60N 2/2821 297/250.1 |
| 2014/0191529 A1 * | 7/2014 | Okuhara | ............... | B60N 3/102 296/37.15 |
| 2014/0361133 A1 * | 12/2014 | Abu-Ulba | ............... | A47C 7/70 248/214 |
| 2015/0375660 A1 | 12/2015 | Gaudreau, Jr. | | |
| 2016/0121768 A1 * | 5/2016 | Terranova | ............... | B60N 2/4673 297/188.14 |
| 2016/0193944 A1 | 7/2016 | Gaudreau, Jr. | | |
| 2017/0120791 A1 * | 5/2017 | Denbo | ............... | B60N 3/103 |

* cited by examiner

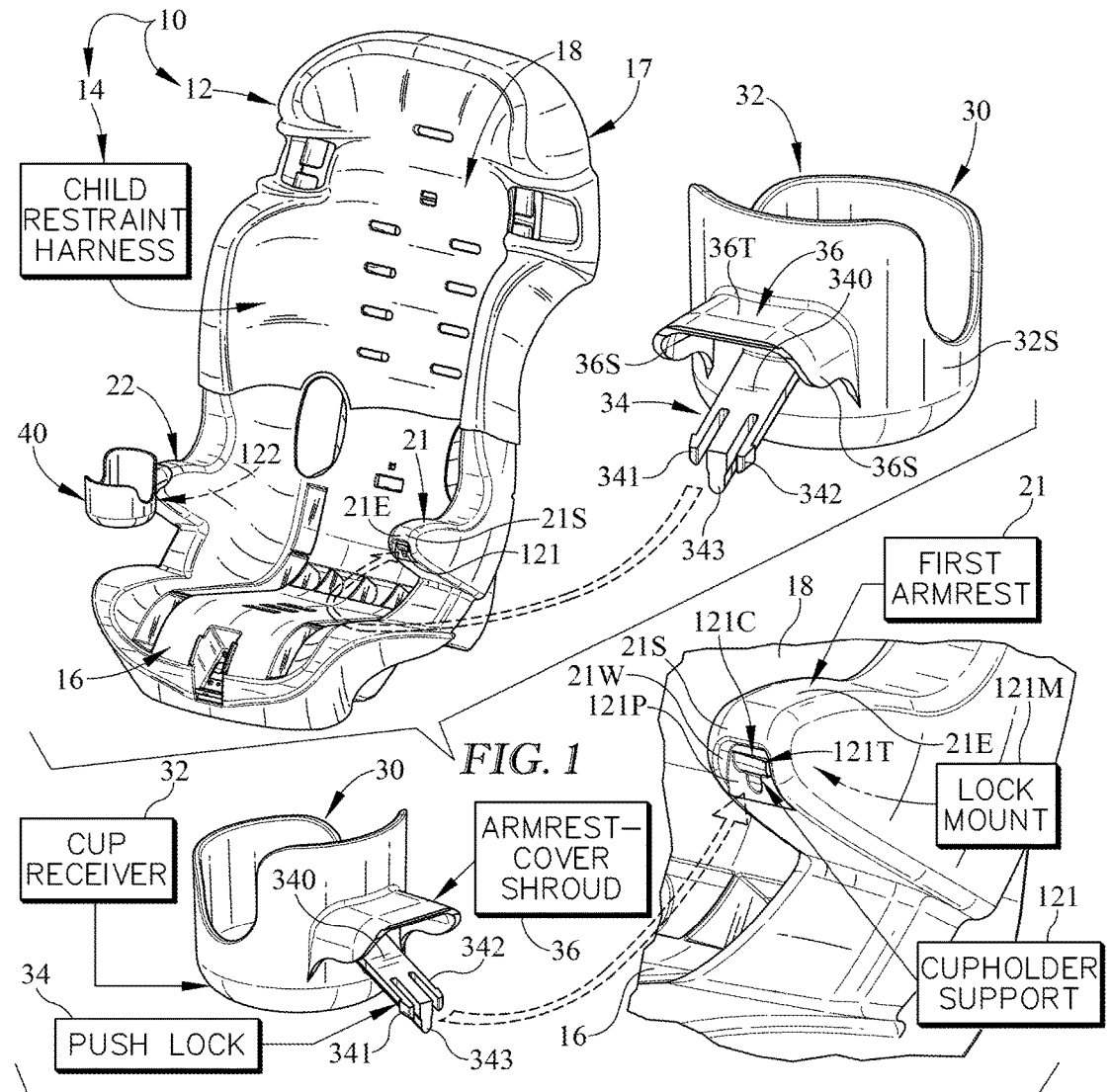
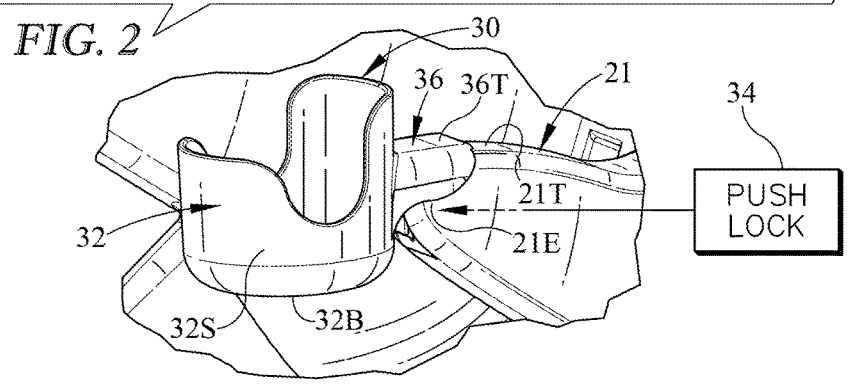
FIG. 1
FIG. 2
FIG. 3

JUVENILE VEHICLE SEAT WITH CUPHOLDER

PRIORITY CLAIM

This application claims priority under 35 U.S.C. § 119(e) to U.S. Provisional Application No. 62/382,356, filed on Sep. 1, 2016, which is expressly incorporated by reference herein.

BACKGROUND

The present disclosure relates to child restraints, and in particular to juvenile seats for use on passenger seats in vehicles. More particularly, the present disclosure relates to a cupholder included in a juvenile seat.

SUMMARY

According to the present disclosure, a child restraint includes a juvenile seat having a seat bottom and a seat back extending upwardly from the seat bottom. In illustrative embodiments, the child restraint also includes a child-restraint harness coupled to the juvenile seat.

In illustrative embodiments, the juvenile seat includes a first armrest arranged to project away from the seat back, a cupholder support coupled to the first armrest and arranged to face away from the seat back, and a cupholder configured to engage and disengage the cupholder support at the option of a caregiver. The cupholder includes a cup receiver adapted to receive a cup therein and a push lock cantilevered to a side wall of the cup receiver and configured to mate with the cupholder support to retain the cup receiver in a stationary mounted position at the free end of the first armrest.

In illustrative embodiments, the cupholder support includes an upright panel mounted in a forward facing position on the free end of the first armrest and formed to include a T-shaped opening. The cupholder support also include a multi-receiver lock mount coupled to a rearwardly facing surface of the upright panel and aligned with the T-shaped opening so that the push lock will be passed through the T-shaped opening and moved into a T-shaped locked-receiver channel formed in the lock mount for movement relative to the lock mount so that the push lock will engage a free-end portion of the lock mount to retain the cupholder in a stationary position on the first armrest when the cupholder is mounted on the first armrest.

In illustrative embodiments, the cantilevered push lock of the cupholder includes a center lock-stabilizer tab arranged to lie between and in spaced-apart relation to flanking elastic bendable first and second retainer clips. The retainer clips and the lock-stabilizer tab are sized and shaped to pass through the T-shaped opening formed in the upright plate of the cupholder support and into companion clip and tab receivers defined by the T-shaped lock-receiver channel formed in the lock mount during mounting of the cupholder by a caregiver on the free end of the first armrest. The retainer clips engage a free-end portion of the lock mount when the cupholder arrives at its stationary mounted position. The lock-stabilizer tab extends through a center tab receiver formed in the lock mount to stabilize the position of the push lock relative to the first armrest when the cupholder arrives at its stationary mounted position.

In illustrative embodiments, the cupholder also includes an armrest-cover shroud that is cantilevered to an exterior portion of a side wall of the cup receiver. The push lock is also cantilevered to the exterior portion of the side wall and arranged to lie below the armrest-cover shroud. The armrest-cover shroud is arranged to lie above and mate with an upwardly facing exterior surface on the free end of the first armrest to cooperate, for example, with the lock-stabilizer tab of the push lock to stabilize the cupholder in a stationary position on the first armrest.

In illustrative embodiments, a second armrest is included in the juvenile seat and a second cupholder support is coupled to a free end of the second armrest. The push lock of the cupholder can be mated with and released from the second cupholder support at the option of a caregiver. It is within the scope of the present disclosure to provide a cupholder with a push lock that is configured to be mated with and released from the first and second cupholder supports. That way only one style of cupholder is needed and such a cupholder is adapted to be retained in a stationary position on the first or second armrest at the option of a caregiver.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed disclosure particularly refers to the accompanying figures in which:

FIG. 1 is a perspective view of a child restraint in accordance with the present disclosure and showing that a juvenile seat included in the child restraint includes a seat bottom, a seat back extending upwardly from the seat bottom, a first armrest (on the right), a first cupholder before it is mounted on a first cupholder support mated with a free end of the first armrest, a second armrest (on the left) and a second cupholder mounted on a second cupholder support mated with a free end of the second armrest;

FIG. 2 is an enlarged perspective assembly view showing the first cupholder before it is mated with the first cupholder support that is associated with the first armrest and suggesting that the first cupholder support includes a lock mount and an upright panel coupled to a forward end of the lock mount and formed to include a T-shaped opening aligned with a T-shaped lock-receiver channel formed in the rearwardly extending lock mount located inside the first armrest and also showing that the cupholder includes a cup receiver, an armrest-cover shroud cantilevered to a side wall of the cup receiver, and a push lock cantilevered to the side wall and arranged to lie below the armrest-cover shroud and configured to extend into and mate with the lock mount as suggested in FIG. 4;

FIG. 3 is a perspective view of a circled portion of FIG. 1 after the first cupholder is mounted on a free end of the first armrest and suggesting that the armrest-cover shroud lies on top of a forward portion of the first armrest while the push lock is hidden inside the forward portion of the first armrest and mated with the lock mount located inside the first armrest as suggested in FIGS. 5 and 6;

DETAILED DESCRIPTION

Figure 4:
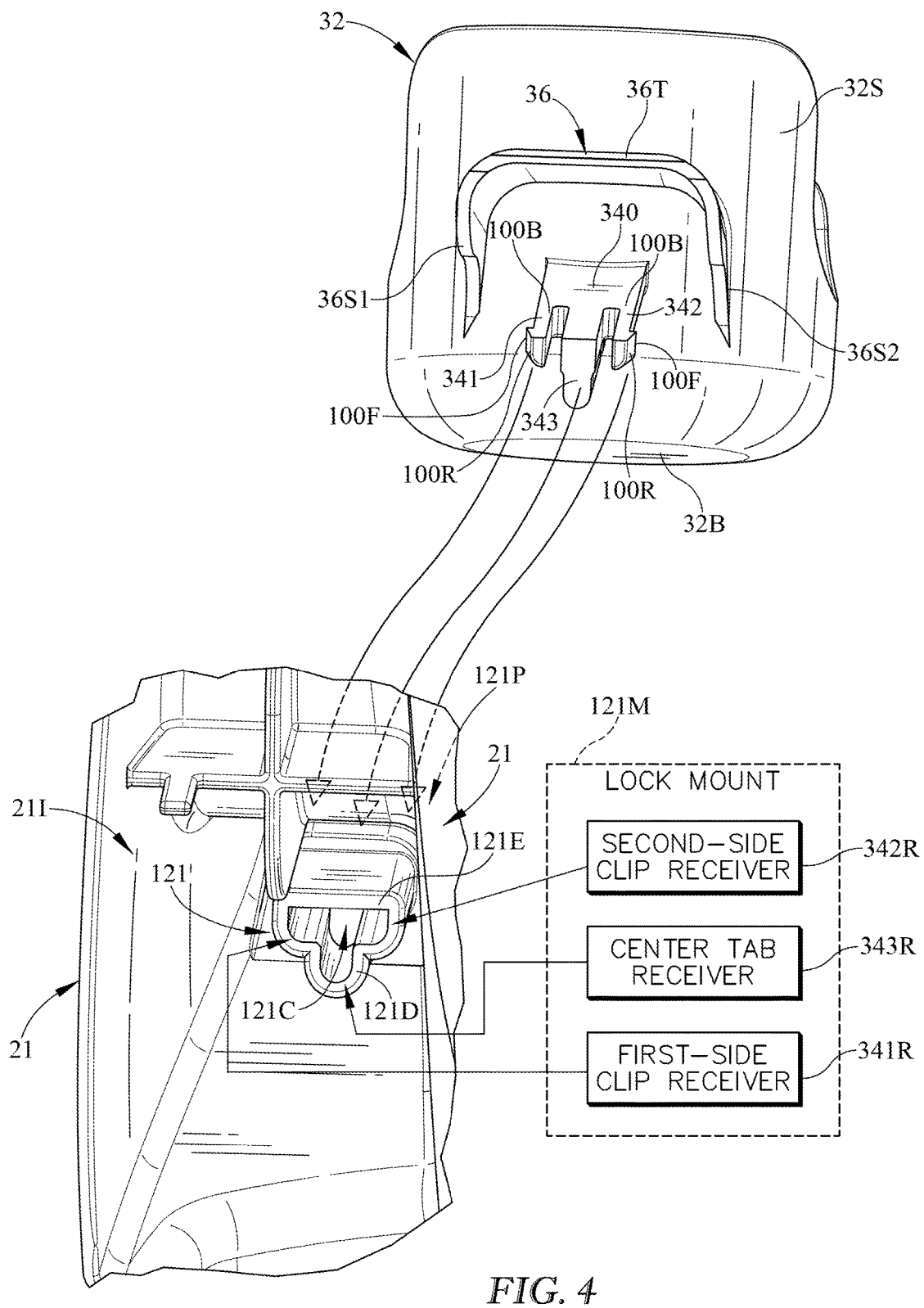
FIG. 4 is another perspective view showing the first cupholder before it is mated with the first cupholder support and showing that the lock mount defines a horizontally extending first-side clip receiver, a horizontally extending second-side clip receiver, and a vertically extending center tab receiver lying between and communicating with the first-side and second-side receivers and further showing that the push lock comprises a first retainer clip associated with the first-side clip receiver, a second retainer clip associated with the second-side clip receiver, and a lock-stabilizer tab arranged to extend and lie between the first and second retainer clips and associated with the center tab receiver.

An illustrative child restraint 10 comprises a juvenile seat 12 and a child-restraint harness 14 coupled to juvenile seat 12 as suggested in FIG. 1. Juvenile seat 12 includes a seat bottom 16, a seat back 18, first and second armrests 21, 22, a first cupholder support 121 coupled to a free end of first armrest 21, and a second cupholder support 122 coupled to a free end of second armrest 22. Seat bottom and back 16, 18 cooperate to form a juvenile holder 17 adapted to support a seated child as suggested in FIG. 1. A first cupholder 30 included in juvenile seat 12 is configured to be mated with the first cupholder support 121 and the armrest 21 as suggested in FIGS. 1 and 2 to assume a stationary mounted position on first armrest 21 as shown in FIG. 3. Juvenile seat 12 also includes a second cupholder 40 that is mated with second cupholder support 122 and second armrest 22 in a similar manner to assume a stationary mounted position on second armrest 22 as shown in FIG. 1.

First cupholder 30 includes a cup receiver 32, a push lock 34, and an armrest-cover shroud 36 as shown, for example, in FIGS. 1-3. Push lock 34 is configured to mate with first cupholder support 121 to hold cup receiver 32 in a stationary position alongside a free end 21E of first armrest 21 as suggested in FIGS. 2 and 3. Armrest-cover shroud 36 is arranged to lie above and cover a portion of free end 21E of first armrest 21 when push lock 34 is mated with the first cupholder support 121 mounted on first armrest 21 as shown, for example, in FIGS. 3 and 6-8.

Second cupholder 40 is identical to and interchangeable with first cupholder 30 in illustrative embodiments of the present disclosure. Second cupholder 40 (like first cupholder 30) is configured to mate with each of first and second cupholder supports 121, 122 in accordance with the present disclosure. In illustrative embodiments, each cupholder 30, 40 is a monolithic component made of a plastics material.

Figure 6:
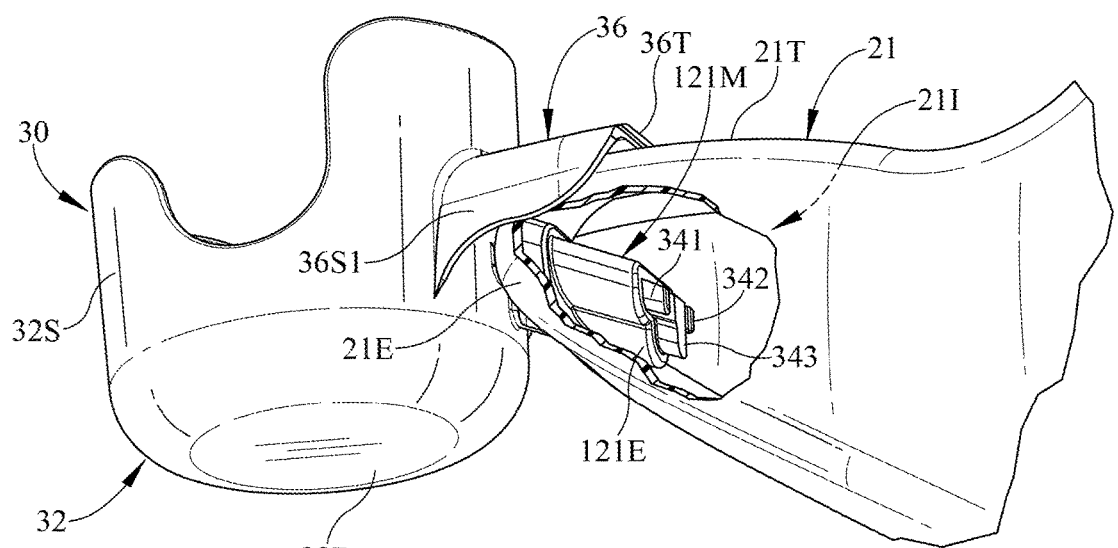
FIG. 6 is a perspective view of a portion of the juvenile seat of FIG. 1 after the first cupholder has been mated with the first cupholder support associated with the first armrest, with portions of the first armrest broken away to show engagement of the push lock with the first cupholder support to retain the first cupholder temporarily in a mounted position on the first armrest until it is later removed at the option of a caregiver.
Figure 8:
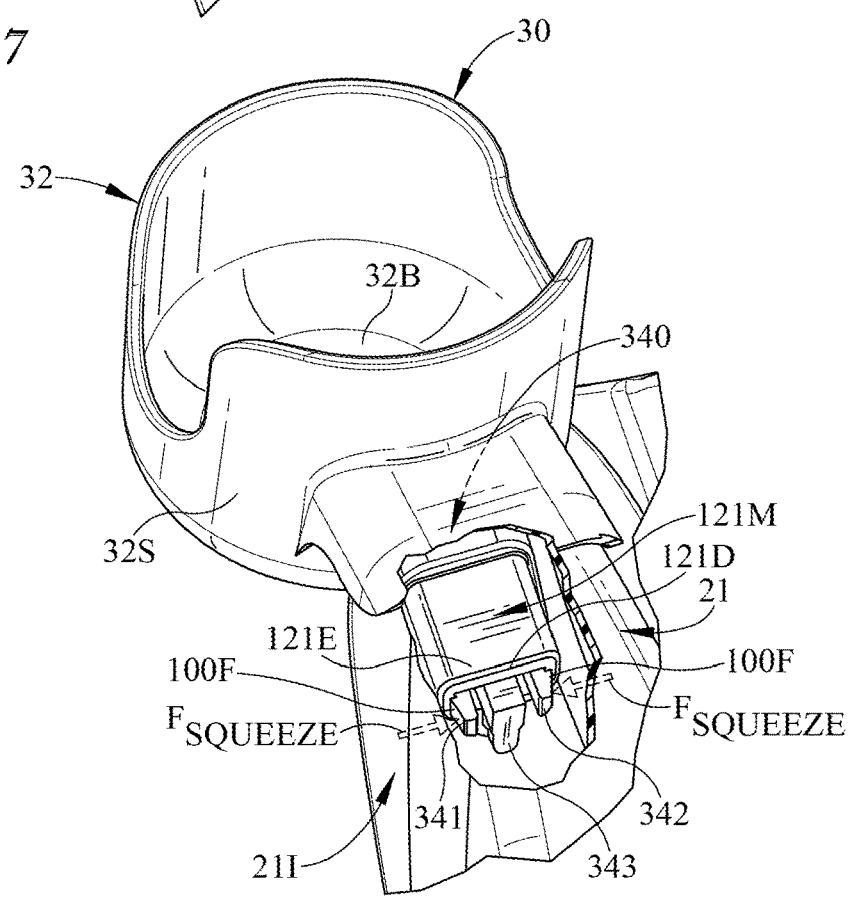
FIG. 8 is a view similar to FIG. 7 showing the first and second retainer clips and the lock-stabilizer tab of the push lock extending rearwardly in the companion receivers formed in the cupholder support and suggesting that a squeeze force can be applied to outermost ends of the retainer clips to disengage those clips from the free end of the lock mount.

Cup receiver 32 includes a bottom wall 32B and a side wall 32S extending upwardly from a perimeter edge of bottom wall 32B as suggested in FIGS. 3, 6, and 8. Cup receiver 32 is formed to include an interior region 32I sized to receive a cup or other item therein. It is within the scope of this disclosure to provide any suitable size or shape for cup receiver 32.

Push lock 34 includes a post 340, a first retainer clip 341, a second retainer clip 342, and a lock-stabilizer tab 343 as shown, for example, in FIGS. 1 and 4. Post 340 is cantilevered to side wall 32S of cup receiver 32. Proximal ends of clips 341, 342 and tab 343 are cantilevered to a free end 340E of post 340. First and second retainer clips 341, 342 are elongated members that are arranged to lie in laterally spaced-apart relation to one another. Lock-stabilizer tab 343 is an elongated member that is arranged to lie between first and second retainer clips 341, 342 and in laterally spaced-apart relation to each of the first and second retainer clips 341, 342 as suggested in FIGS. 1 and 4. As suggested in FIG. 5, the vertical height of clips 341, 342 is about equal and the vertical height of tab 343 is about twice the vertical height of clips 341, 342.

Each of first and second retainer clips 341, 342 is made of an elastically deformable material to allow for movement of each of clips 341, 342 relative to lock-stabilizer tab 343 during installation of push lock 34 in and separation of push lock 34 from cupholder support 121. Each retainer clip 341, 342 includes an elongated deflectable beam 100B and a retention flange 100F coupled to the end of the beam 100B and formed to include an inclined cam ramp 100R coupled to beam 100B and arranged to face away from post 340 as suggested in FIG. 4. Each retention flange 100F is sized to engage and mate with free end 121E of lock mount 121M when push lock 34 is engaged to lock mount 121M as suggested in FIGS. 5 and 8. In illustrative embodiments, push lock 34 is a monolithic component made of a plastics material.

First cupholder support 121 includes a vertical panel 121P formed to include T-shaped lock-receiver opening 121T and a lock mount 121M coupled to vertical panel 121P and formed to include an elongated T-shaped lock-receiver channel 121C aligned with T-shaped lock-receiver opening 121T as suggested in FIG. 2. Lock mount 121M is formed to include, in series, a first-side clip receiver 341R, a center tab receiver 343R, and a second-side clip receiver 342R aligned with T-shaped lock-receiver opening 121T as suggested in FIGS. 2 and 4. These receivers 341R, 342R, 343R cooperate to form the elongated T-shaped lock-receiver channel 121C that extends rearwardly from the T-shaped lock-receiver opening 121T formed in vertical panel 121P to a distal end 121E of lock mount 121M and is sized to receive the first and second retainer clips 341, 342 and the lock-stabilizer tab 343 when push lock 34 is coupled to cupholder support 121.

Armrest-cover shroud 36 is cantilevered to side wall 32S of cup receiver 32 as suggested in FIGS. 2, 4, and 8. Shroud 36 includes a top wall 36T arranged to lie between and interconnect two downwardly extending flanking side walls 36S1, 36S2 as shown, for example, in FIG. 1. Top wall 36T of shroud 36 is arranged to lie above and in confronting relation to a top armrest wall 21T of first armrest 21 when first cupholder 30 is mounted on first armrest 21 as suggested in FIGS. 3, 6, and 7.

Child restraint 10 includes a juvenile seat 12 having a seat bottom 16 and a seat back 18 extending upwardly from seat bottom 18 and cooperating with seat bottom 18 to form a juvenile holder 17 as suggested in FIG. 1. In illustrative embodiments, child restraint 10 also includes a child-restraint harness 14 coupled to juvenile seat 12 as suggested diagrammatically in FIG. 1.

Juvenile seat includes a first armrest 21 arranged to project away from seat back 18, a first cupholder support 121 coupled to first armrest 21 and arranged to face away from seat back 18, and a cupholder 30 configured to engage and disengage cupholder support 121 at the option of a caregiver as suggested in FIGS. 1-3. Cupholder 30 includes a cup receiver 32 adapted to receive a cup (not shown) therein and a push lock 34 cantilevered to a side wall 32S of the cup receiver and configured to mate with first cupholder support 121 to retain cup receiver 32 in a stationary mounted position at the free end 21E of first armrest 21.

First cupholder support 121 includes an upright (e.g. vertical) panel 121P mounted in a forward facing position on the free end 21E of first armrest 21. Vertical panel 21P is formed to include a T-shaped opening 121T as suggested in FIG. 2. First cupholder support 121 also includes a multi-receiver lock mount 121M coupled to a rearwardly facing surface of upright panel 121P and aligned with T-shaped opening 121T so that push lock 14 will be passed through T-shaped opening 121T and moved into a T-shaped lock-receiver channel 121C formed in lock mount 121M relative to the lock mount 121 so that push lock 14 will engage a portion of lock mount 121M to retain first cupholder 121 in a stationary mounted position on first armrest 21 when cupholder 30 is mounted on first armrest 21.

The cantilevered push lock 14 of first cupholder 30 includes a center lock-stabilizer tab 343 arranged to lie between and in spaced-apart relation to flanking elastic bendable first and second retainer clips 341, 342 as suggested in FIG. 4. Retainer clips 341, 342 and lock-stabilizer tab 343 are sized and shaped to pass through the T-shaped opening 121T formed in vertical plate 121P of the first cupholder support 121 and into a companion clip or tab receiver 341R-343R formed in lock mount 121M during mounting of cupholder 30 by a caregiver on the free end 21E of first armrest 21 as suggested in FIGS. 2 and 3. The retainer clips 341, 342 engage outer portions of the lock mount 121M when the cupholder 30 arrives at its mounted position. The lock-stabilizer tab 343 extends through a center tab receiver 343R formed in lock mount 121M to stabilize the position of push lock 114 relative to first armrest 21 when cupholder 30 arrives at its mounted position.

Cupholder 30 also includes an armrest-cover shroud 36 that is cantilevered to an exterior portion of a side wall 32S of cup receiver 32 as suggested in FIG. 2. Push lock 34 is also cantilevered to the exterior portion of side wall 32S and arranged to lie below armrest-cover shroud 36 as suggested in FIG. 4. Armrest-cover shroud 36 is arranged to lie above and mate with an upwardly facing exterior surface on free end 21E of first armrest 21 to cooperate, for example, with the lock-stabilizer tab 343 of push lock 34 to stabilize cupholder 30 in a stationary position on first armrest 21.

Child restraint 10 includes a juvenile seat 12, a cupholder 21, and a cupholder support 121 as shown, for example, in FIG. 1. Juvenile seat 12 includes a juvenile holder 17 formed to include a child-seating surface adapted to support a seated child and a first armrest 21 coupled to juvenile holder 17 and configured to have a free end 21E as suggested in FIG. 1. Cupholder support 121 is coupled to the free end 21E of first armrest 21 and formed to include a single lock-receiver opening 121T at free end 21E of first armrest 21. Cupholder 21 includes a cup receiver 32 adapted to receive a cup therein and a cantilevered push lock 34 cantilevered to a side wall 32S of cup receiver 32. Cantilevered push lock 34 is configured to extend into the single lock-receiver opening 121T provided in cupholder support 121 at free end 21E of first armrest 21 to mate with cupholder support 121 to retain cup receiver 32 in a stationary mounted position at free end 21E of first armrest 21.

Cupholder support 121 includes an upright panel 121P and a cantilevered push lock 34 as suggested in FIG. 2. Upright panel 121P is mounted in a forward facing position on free end 21E of first armrest 21 to face toward cup receiver 32. Upright panel 121P is formed to include the single lock-receiver opening 121T.

Figure 5:
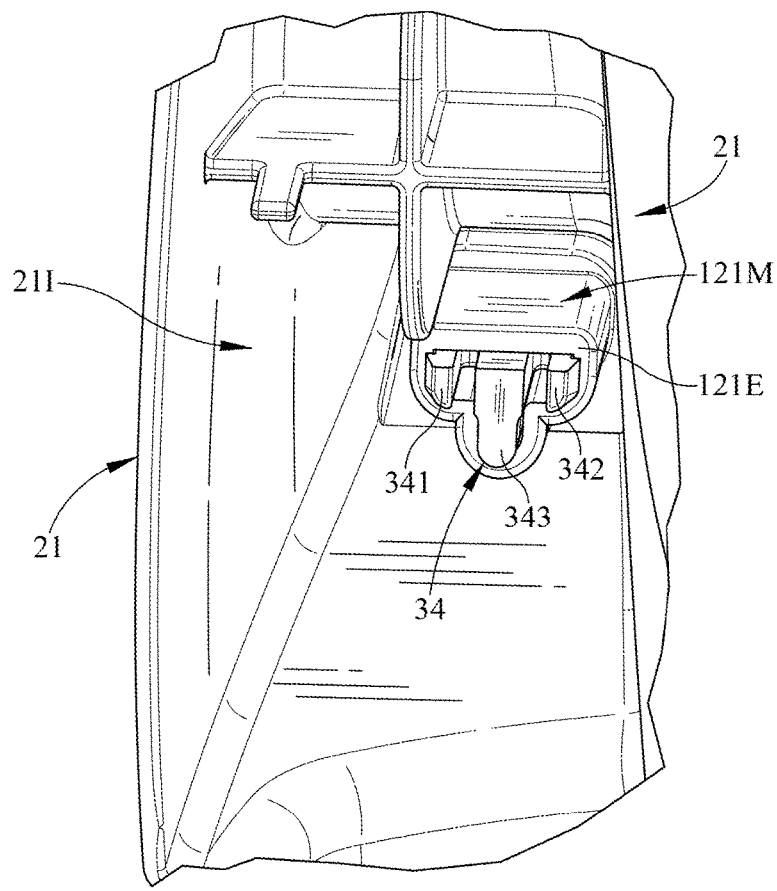
FIG. 5 is a perspective view similar to FIG. 4 after the first cupholder is mated with the first cupholder support and showing the placement of the lock mount of the first cupholder support inside a chamber formed in the first armrest.

Cantilevered push lock 34 includes a first retainer clip 341 and a second retainer clip 342 arranged to lie in laterally spaced-apart relation to one another during movement of first and second retainer clips 341, 342 through the single lock-receiver opening 121T formed in the upright panel 121P of cupholder support 121 as suggested in FIGS. 2 and 4 to cause first and second retainer clips 341, 342 to mate with cupholder support 121 as suggested in FIG. 5. Each of the first and second retainer clips 341, 342 is arranged to lie wholly in an interior region 211 formed in first armrest 21 when cup receiver 32 is retained in the stationary mounted position as suggested in FIG. 8.

Cantilevered push lock 34 further includes a post 340 cantilevered to side wall 32S of cup receiver 32 as shown, for example, in FIGS. 1 and 2. Post 340 is arranged to extend through the single lock-receiver opening 121T formed in upright panel 121P of cupholder support 121 when cup receiver 32 is retained in the stationary mounted position at free end 21E of first armrest 21 as suggested in FIG. 8. Each of first and second retainer clips 341, 342 are cantilevered to a free end of post 340 to lie in rearwardly spaced-apart relation to side wall 32S of cup receiver 32 as shown in FIGS. 1, 2, and 4.

Upright panel 121P of cupholder support 121 is arranged to lie in rearwardly spaced-apart relation to side wall 32S of cup receiver 32 as suggested in FIGS. 2 and 3. A portion of post 340 of cantilevered push lock 34 is arranged to extend between and bridge a space provided between upright panel 121P of cupholder support 121 and side wall 32S of cup receiver 32 when cup receiver 32 is retained in the stationary position.

Cantilevered push lock 34 further includes a lock-stabilizer tab 343 that is arranged to lie between and in spaced-apart relation to each of the first and second retainer clips 341, 342 as shown, for example, in FIGS. 2 and 4. Cupholder support 121 further includes a multi-receiver lock mount 121M coupled to a rearwardly facing surface of upright panel 121P to lie in an interior region of first armrest 21. Multi-receiver lock mount 121M is formed to include a first-side clip receiver 341R, a second-side clip receiver 342R, and a center tab receiver 343R located between the first-side and second-side clip receivers 341, 342 as suggested in FIG. 4. Each of the receivers 341R, 342R, 343R is aligned with the single lock-receiver opening 121T formed in upright panel 121P of cupholder support 121 to receive therein a portion of the cantilevered push lock 34 during movement of the cantilevered push lock 34 through the single lock-receiver opening 121T and into the multi-receiver lock mount 121M. When the cup receiver 32 is retained in the stationary mounted position, first retainer clip 341 extends through and locks onto the first-side clip receiver 341R, second retainer clip 342 extends through and locks onto the second-side clip receiver 342R, and lock-stabilizer tab 343 extends into the center tab receiver 343R. Lock-stabilizer tab 343 is cantilevered to free end of post 340.

The free end 21E of first armrest 121 is formed to include a forward facing exterior surface 21S arranged to face toward side wall 32S of cup receiver 32 when cup receiver 32 is retained in the stationary mounted position as shown in FIGS. 1 and 2. Free end 21E of first armrest 21 also includes a rearwardly extending U-shaped transitional armrest side wall 21W having a forward edge appended to a perimeter edge of the forward facing exterior surface and a rearward edge appended to upright panel 121P of cupholder support 121P as shown in FIG. 2. A downwardly facing top wall of the rearwardly extending U-shaped transitional armrest side wall 21W is arranged to overlie and face toward a portion of cantilevered push lock 34 when cup receiver 32 is retained in the stationary mounted position.

Cantilevered push lock 34 includes a post 340 is cantilevered to side wall 32S of cup receiver 32 as shown in FIG. 1. Post 340 is arranged to extend through the single lock-receiver opening 121T formed in upright panel 121P of cupholder support 121 to cause a portion of post 340 to underlie the downwardly facing top wall of the rearwardly extending U-shaped transitional armrest side wall 21W. Cantilevered push lock 34 also includes a first retainer clip 341 cantilevered to a free end of post 340 and arranged to engage cupholder support 121 when cup receiver 32 is retained in the stationary mounted position and a second retainer clip 342 cantilevered to free end of post 340 and arranged to engage cupholder support 121 when cup receiver 32 is retained in the stationary mounted position.

Cupholder 30 further includes an armrest-cover shroud 36 cantilevered to side wall 32S of cup receiver 32 as shown in FIGS. 1 and 2. Armrest-cover shroud 36 is arranged to overlie each of the forward facing exterior surface 21S and the rearwardly extending U-shaped transitional armrest side wall 21W of first armrest 21 when cup receiver 32 is retained in the stationary position.

The single lock-receiver opening 121T is T-shaped to provide a relatively tall center opening portion between a relatively short upper right opening portion and a short upper left opening portion as suggested in FIG. 2. Cupholder support 121 further includes a multi-receiver lock mount 121M coupled to a rearwardly facing surface of upright panel 121P to align the relatively short upper left opening portion with a first-side clip receiver 341R included in the multi-receiver lock mount 121M, align the relatively short upper right opening portion with a second-side clip receiver 342R included in the multi-receiver lock mount 121M, and align the relatively tall center opening portion with a center tab receiver 341R included in the multi-receiver lock mount 121M. Cantilevered push lock 34 includes a first retainer clip 341 arranged to extend through first-side clip receiver 341R and mate with multi-receiver lock mount 121M, a second retainer clip arranged to extend through second-side clip receiver 342R and mate with multi-receiver lock mount 121M, and a lock-stabilizer tab 343 arranged to extend through center tab receiver 343R when cup receiver 32 is retained in the stationary mounted position as suggested in FIGS. 4 and 8.

Multi-receiver lock mount 121M includes a distal end 121D arranged to lie in spaced-apart relation to upright panel 121P to locate the first-side, second-side, and center tab receivers 341R, 342R, 343R therebetween as suggested in FIG. 4. Each retainer clip 341, 342 includes a retention flange 100F that is arranged to engage and mate with distal end 121D of multi-receiver lock mount 121M to retain cantilevered push lock 34 in a stationary position relative to multi-receiver lock mount 121 when cup receiver 32 is retained in the stationary mounted position as shown in FIG. 8. Each of retainer clips 341R, 342 is made of an elastically deformable material to allow for movement of each of retainer clips 341, 342 relative to lock-stabilizer tab 343 during installation of cantilevered push lock 34 in and separation of cantilevered push lock 34 from multi-receiver lock mount 121M of cupholder support 121.

Cupholder support 121 includes a lock mount 121M held in a stationary position in an interior region 211 of first armrest 21 as suggested in FIG. 4. Lock mount 121M is formed to include a lock-receiver channel 121C aligned with and extending in a rearward direction away from the single lock-receiver opening 121T provided in cupholder support 121 to receive cantilevered push lock 34 therein when cup receiver 32 is retained in the stationary mounted position.

Figure 7:
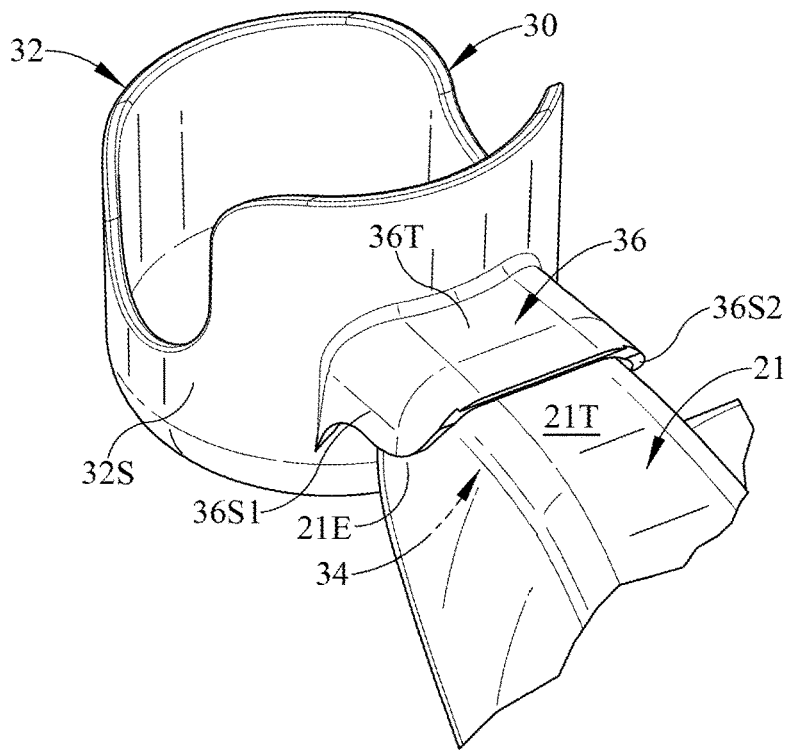
FIG. 7 is another perspective view of the first cupholder on the first armrest.

Cupholder 30 further includes an armrest-cover shroud 36 cantilevered to side wall 32S of cup receiver 32 as suggested in FIGS. 4 and 7. Armrest-cover shroud 36 is arranged to lie above and in confronting relation to a top armrest wall 21T of first armrest 21 to locate top armrest wall between armrest-cover shroud 36 and cantilevered push lock 34 when cup receiver 32 is retained in the stationary mounted position.

Cantilevered push lock 34 includes a center lock-stabilizer tab 340 that is arranged to lie between and in spaced-apart relation to flanking elastic bendable first and second retainer clips 341, 342 also included in the cantilevered push lock 34 as suggested in FIGS. 1 and 2. Retainer clips 341, 342 and lock-stabilizer tab 343 are sized and shaped to pass through the single lock-receiver opening 121T provided in cupholder support 121 and into the lock-receiver channel 121C formed in lock mount 121M during mounting of cupholder 30 by a caregiver on free end 21E of first armrest 21. Retainer clips 341, 342 engage a free-end portion 121D of lock mount 121M to retain the retainer clips 341, 342 and lock-stabilizer tab 343 in the lock-receiver channel 121C formed in lock mount 121M when cup receiver 32 is retained in the stationary mount position as suggested in FIG. 8.

Lock-stabilizer tab 343 extends through a center tab receiver 343R provided in the lock-receiver channel 121C to stabilize the position of cantilevered push lock 34 in lock mount 121M and relative to first armrest 21 when cup receiver 32 is retained in the stationary mount position. First retainer clip 341 extends through a first-side clip receiver 341R provided in lock-receiver channel 121C. Second retainer clip 342 extends through a second-side clip receiver 342R provided in lock-receiver channel 121C. Central tab receiver 343R communicates along its length with each of the first-side and second-side clip receiver 341R, 342R as suggested in FIG. 4. Each of the single lock-receiver opening 12T and the lock-receiver channel 121C is T-shaped.

Cupholder 30 further includes an armrest-cover shroud 36 cantilevered to side wall 32S and arranged to overlie cantilevered push lock 34. Free end 21E of first armrest 21 includes a top armrest wall that is positioned to lie between a top portion of armrest-cover shroud 36 and push lock 34 when cup receiver 32 is retained on the stationary mounted position. Armrest-cover shroud 36 is U-shaped in lateral cross-section.

The invention claimed is:

1. A child restraint comprising
a juvenile seat including a juvenile holder formed to include a child-seating surface adapted to support a seated child and a first armrest coupled to the juvenile holder and configured to have a free end,
a cupholder support coupled to the free end of the first armrest and formed to include a single lock-receiver opening at the free end of the first armrest, and
a cupholder including a cup receiver adapted to receive a cup therein and a cantilevered push lock cantilevered to a side wall of the cup receiver and configured to extend into the single lock-receiver opening provided in the cupholder support at the free end of the first armrest to mate with the cupholder support to retain the cup receiver in a stationary mounted position at the free end of the first armrest, wherein the cupholder support includes an upright panel mounted in a forward facing position on the free end of the first armrest to face toward the cup receiver and formed to include the single lock-receiver opening, wherein the cantilevered push lock includes a first retainer clip and a second retainer clip arranged to lie in laterally spaced-apart relation to one another during movement of the first and second retainer clips through the single lock-receiver opening formed in the upright panel of the cupholder support to cause the first and second retainer clips to mate with the cupholder support, wherein each of the first and second retainer clips is arranged to lie wholly in an interior region formed in the first armrest when the cup receiver is retained in the stationary mounted position, wherein the cantilevered push lock further includes a post cantilevered to the side wall of the cup receiver and arranged to extend through the single lock-receiver opening formed in the upright panel of the cupholder support when the cup receiver is retained in the stationary mounted position at the free end of the first armrest and wherein each of the first and second retainer clips are cantilevered to a free end of the post to lie in rearwardly spaced-apart relation to the side wall of the cup receiver, and wherein the cantilevered push lock further includes a lock-stabilizer tab that is arranged to lie between and in spaced-apart relation to each of the first and second retainer clips, the cupholder support further includes a multi-receiver lock mount coupled to a rearwardly facing surface of the upright panel to lie in an interior region of the first armrest and formed to include a first-side clip receiver, a second-side clip receiver, and a center tab receiver located between the first-side and second-side clip receivers, and each of the first-side clip receiver, the second side-clip receiver, and the center tab receiver is aligned with the single lock-receiver opening formed in the upright panel of the cupholder support to receive therein a portion of the cantilevered push lock during movement of the cantilevered push lock through the single lock-receiver opening and into the multi-receiver lock mount, and wherein, when the cup receiver is retained in the stationary mounted position, the first retainer clip extends through and locks onto the first-side clip receiver, the second retainer clip extends through and locks onto the second-side clip receiver, and the lock-stabilizer tab extends into the center tab receiver.

2. The child restraint of claim 1, wherein the lock-stabilizer tab is cantilevered to the free end of the post.

3. A child restraint comprising
a juvenile seat including a juvenile holder formed to include a child-seating surface adapted to support a seated child and a first armrest coupled to the juvenile holder and configured to have a free end,
a cupholder support coupled to the free end of the first armrest and formed to include a single lock-receiver opening at the free end of the first armrest, and
a cupholder including a cup receiver adapted to receive a cup therein and a cantilevered push lock cantilevered to a side wall of the cup receiver and configured to extend into the single lock-receiver opening provided in the cupholder support at the free end of the first armrest to mate with the cupholder support to retain the cup receiver in a stationary mounted position at the free end of the first armrest, wherein the cupholder support includes an upright panel mounted in a forward facing position on the free end of the first armrest to face toward the cup receiver and formed to include the single lock-receiver opening, wherein the single lock-receiver opening is T-shaped to provide a center opening portion between an upper right opening portion and a left opening portion, the cupholder support further includes a multi-receiver lock mount coupled to a rearwardly facing surface of the upright panel to align the upper left opening portion with a first-side clip receiver included in the multi-receiver lock mount, align the upper right opening portion with a second-side clip receiver included in the multi-receiver lock mount, and align the center opening portion with a center tab receiver included in the multi-receiver lock mount, and the cantilevered push lock includes a first retainer clip arranged to extend through the first-side clip receiver and mate with the multi-receiver lock mount, a second retainer clip arranged to extend through the second-side clip receiver and mate with the multi-receiver lock mount, and a lock-stabilizer tab arranged to extend through the center tab receiver when the cup receiver is retained in the stationary mounted position.

4. The child restraint of claim 3, wherein the multi-receiver lock mount includes a distal end arranged to lie in spaced-apart relation to the upright panel to locate the first-side clip receiver, the second-side clip receiver, and the center tab receiver therebetween, and each of the first and second retainer clips includes a retention flange that is arranged to engage and mate with the distal end of the multi-receiver lock mount to retain the cantilevered push lock in a stationary position relative to the multi-receiver lock mount when the cup receiver is retained in the stationary mounted position.

5. The child restraint of claim 4, wherein each of the first and second retainer clips is made of an elastically deformable material to allow for movement of each of the first and second retainer clips relative to the lock-stabilizer tab during installation of the cantilevered push lock in and separation of the cantilevered push lock from the multi-receiver lock mount of the cupholder support.

6. The child restraint of claim 3,
wherein the center lock-stabilizer tab extends through a center tab receiver provided in a lock-receiver channel to stabilize a position of the cantilevered push lock in the multi-receiver lock mount and relative to the first armrest when the cup receiver is retained in the stationary mount position, the first retainer clip extends through a first-side clip receiver provided in the lock-receiver channel, the second retainer clip extends through a second-side clip receiver provided in the lock-receiver channel, and the center tab receiver communicates along a length of the center tab receiver with each of the first-side and second-side clip receiver.

7. The child restraint of claim 6, wherein each of the single lock-receiver opening and the lock-receiver channel is T-shaped.

* * * * *